United States Patent Office 2,838,467
Patented June 10, 1958

2,838,467

KETO-ACID ESTER PLASTICIZERS FOR VINYL-IDENE CYANIDE POLYMERS

Donald Gene Dobay, Brecksville, Ohio, assignor to The B. F. Goodrich Company, New York, N. Y., a corporation of New York No Drawing. Application August 30, 1955
Serial No. 531,591

13 Claims. (Cl. 260—31.6)

This invention relates to novel compositions of matter comprising a polymer of vinylidene cyanide plasticized with an ester of an oxocarboxylic acid with an alcohol, and more particularly relates to strong, flexible films made of an interpolymer of vinylidene cyanide with a vinyl or vinylidene compound which copolymer has been plasticized with an ester of a 4-oxocarboxylic acid with an alcohol.

U. S. Patents 2,476,270, 2,502,412 and 2,414,387 disclose the preparation of monomeric vinylidene cyanide, also named 1,1-dicyano ethylene, which is a clear liquid at room temperature and a crystalline solid at 0° C., possessing a melting point when in purest form of about 9.7° C., and which undergoes on contact with water an instantaneous homopolymerization reaction to give a solid, water-insoluble resin. On copolymerization of this monomer in mass or in anhydrous organic medium with various other polymerizable materials, there are obtained resinous copolymers which are extremely useful in the preparation of filaments, films and shaped articles possessing many valuable properties including high tensile strength, low elongation and excellent resistance to the action of chemicals and the weather.

It has been found, however, that vinylidene cyanide polymers and interpolymers are extremely difficult to process by normal mixing, milling or calendering operations to form sheets, films and the like. Moreover, such polymers rapidly degrade when heated to temperatures at which they soften or melt. Reduction of melt viscosity of vinylidene cyanide interpolymers by the addition of a plasticizer thereto has heretofore been unsuccessful since most commercially available plasticizers are incompatible with vinylidene cyanide interpolymers.

It is an object of this invention to prepare plasticized compositions comprising a vinylidene cyanide polymer or interpolymer and a plasticizer compatible with the polymer at elevated and reduced temperatures. It is another object of this invention to prepare vinylidene cyanide polymers containing a plasticizer which reduces the melt viscosity of the polymer at elevated temperatures. Still another object of this invention is to prepare plasticized vinylidene cyanide polymers which have excellent electrical properties and good low temperature flexibility.

It has now been discovered that the above and other objects are readily attained by incorporating with a vinylidene cyanide polymer, as a plasticizer therefor, an ester of a 4-oxocarboxylic acid with an alcohol.

The 4-oxocarboxylic acids which can be esterified with alcohols to form suitable plasticizers for use in this invention possess the following formula:

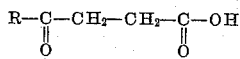

wherein R represents either a hydrocarbon radical, which is preferably an alkyl group, but which may also be a cycloalkyl or aryl or other hydrocarbon radical, in which case the acid is a monocarboxylic acid, or a carboxy-substituted alkyl radical, in which case the acid is a dicarboxylic acid. Such acids include among others: 4-oxopentanoic (levulinic) acid, 4-oxohexanoic acid, 4-oxoheptanoic acid, 4-oxooctanoic acid, 4-oxononanoic acid, 4-oxodecanoic acid, 4-phenyl-4-oxobutyric acid, 4-cyclohexyl-4-oxobutyric acid, 4-oxopimelic acid and the like.

The alcohols used to esterify the 4-oxocarboxylic acids in the plasticizers of this invention possess the formula:

wherein $R_1$ represents the hydrocarbon residue of a monohydric or polyhydric alcohol and $n$ is an integer, preferably 1 or 2. These alcohols include methyl, ethyl, propyl, butyl, isobutyl and amyl alcohols, ethylene, propylene and butylene glycols, as well as cyclopentyl, cyclohexyl, and benzyl alcohols, among others.

Esters of 4-oxocarboxylic acids useful in the practice of this invention include:

(1) Monoesters of 4-oxo-monocarboxylic acids and monohydric alcohols, of the structural formula:

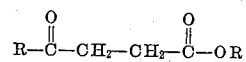

such as methyl 4-oxopentanoate, ethyl 4-oxopentanoate, isopropyl 4-oxopentanoate, n-butyl 4-oxopentanoate, secondary butyl 4-oxopentanoate, pentyl 4-oxopentanaoate, n-hexyl 4-oxopenanoate, cyclohexyl 4-oxopentanoate, benzyl 4-oxopentanoate, ethyl 4-oxohexanoate, propyl 4-oxohexanoate, butyl 4-oxohexanoate, methyl 4-oxoheptanoate, ethyl 4-oxooctanoate, methyl 4-oxononanoate, ethyl 4-oxodecanoate, ethyl 4-phenyl-4-oxobutyrate, methyl 4-cyclohexyl-4-oxobutyrate, and the like. Preferred monoesters in accordance with the above formula are those wherein each R is an alkyl group containing no more than six carbon atoms.

(2) Diesters of 4-oxodicarboxylic acids and monohydric alcohols, of the structural formula:

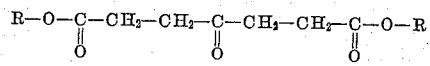

such as dimethyl 4-oxopimelate (also known as dimethyl gamma-keto pimelate), diethyl 4-oxopimelate, diisopropyl 4-oxopimelate, dibutyl 4-oxopimelate, dihexyl 4-oxopimelate, methyl ethyl 4-oxopimelate, dicyclohexyl 4-oxopimelate, dibenzyl 4-oxopimelate and the like. Preferred diesters in accordance with the above are those compounds wherein each R is an alkyl group having no more than six carbon atoms.

(3) Diesters of 4-oxo-monocarboxylic acids and dihydric alcohols, of the structural formula:

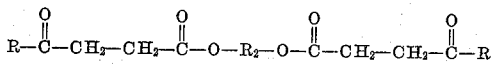

such as ethylene di-4-oxopentanoate, ethylene di-4-oxohexanoate, ethylene di-4-oxooctanoate, ethylene di-4-oxodecanoate, ethylene di(4-cyclohexyl-4-oxobutyrate), ethylene di-(4-benzyl-4-oxobutrate), trimethylene-(di-4-oxopentanoate), trimethylene-(di-4-oxodecanoate) and the like. Preferred diesters in accordance with the above formula are those wherein each R is an alkyl group having not more than six carbon atoms in said group and $R_2$ is a chain of —$CH_2$— groups of 2 to 6 carbon atoms.

Other esters of 4-oxocarboxylic acids, in addition to the mono and diesters illustrated above, are polyesters of dibasic 4-oxocarboxylic acids and polyhydric alcohols, such as a high molecular weight polyester of 4-oxopimelic acid and ethylene glycol. The most preferred aliphatic esters of this invention are those prepared from mono or dihydric alcohols containing from 1 to 6 carbon atoms and 4-oxocarboxylic acids containing from 5 to 10 carbon atoms.

In general, compounds suitable as plasticizers in accordance with this invention include mono, di and polyesters of 4-oxocarboxylic acids with mono and polyhydric alcohols, all of which possess one or more

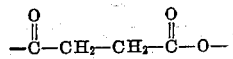

units within the molecular structure.

The vinylidene cyanide polymers which form useful plasticized compositions when incorporated with alcohol esters of 4-oxocarboxylic acid in accordance with this invention include homopolymeric vinylidene cyanide and, more preferably, any interpolymer of vinylidene cyanide with any other olefinic monomer copolymerizable therewith. The nature of the olefinic monomers copolymerized with the vinylidene cyanide is not critical; however, the most useful interpolymers are those made up of about 50 mole percent vinylidene cyanide and about 50 mole percent of a monoolefinic monomer which copolymerizes with vinylidene cyanide to form an essentially 1 to 1 (or 50 mole percent) alternating copolymer.

Among the monoolefinic compounds which form the essentially 1 to 1 alternating copolymers with vinylidene cyanide are included, by way of example, the following classes of compounds:

(1) Vinyl esters of aliphatic monocarboxylic acids, preferably of the structure RCOOH, wherein R is alkyl, such as vinyl acetate, vinyl propionate, vinyl butyrate, vinyl isobutyrate, vinyl valerate, vinyl caproate, vinyl enanthate and the like. The copolymerization with vinylidene cyanide of such copolymerizable monomers and the resulting copolymers are described more fully in U. S. Patent 2,615,866. Mixtures of these two-component copolymers with 4-oxocarboxylic acid esters form a particularly preferred class of compositions within the scope of this invention;

(2) Vinyl esters of the structure

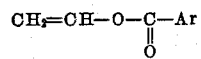

where Ar is an aromatic radical in which all the hydrogen atoms are attached to carbon atoms, such as vinyl benzoate, homologues of vinyl benzoate, for example, vinyl toluate and the like, monomers of the above general class, wherein the aromatic radical is halogen substituted, such as vinyl p-chlorobenzoate, vinyl o-chlorobenzoate, vinyl m-chlorobenzoate, and similar vinyl halo-benzoates and monomers of the above general class wherein the aromatic radical is alkoxy substituted, for example, vinyl p-methoxybenzoate, vinyl o-methoxybenzoate and vinyl p-ethoxybenzoate. The copolymerization with vinylidene cyanide of such monomers, and the resulting copolymers are disclosed in U. S. Patent 2,615,867;

(3) Styrene and substituted styrenes of the general formula

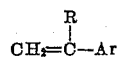

wherein Ar is an aromatic radical in which all of the hydrogen atoms are attached to carbon atoms and R is a member of the class consisting of hydrogen atoms and alkyl radicals, preferably those which contain from 1 to 4 carbon atoms, such as styrene itself, and substituted styrenes such as alpha-methyl styrene, alpha-ethyl styrene, alpha-butyl styrene, alpha-chlorostyrene, alpha-bromostyrene, 2,5-dichlorostyrene, 2,5-dibromostyrene, ortho-, meta-, and para-methoxystyrene, para-alpha-dimethyl styrene, para-methyl styrene, 3,4-dichlorostyrene, 3,4-difluorostyrene, 2,4-dichlorostyrene, 2,4,5-trichlorostyrene, dichloro-mono-fluorostyrenes and the like. Copolymerization of vinylidene cyanide with styrene and substituted styrenes is disclosed in U. S. Patent 2,615,868;

(4) Olefins such as propylene, isobutylene (2-methyl propene-1), 2-methylbutene-1, 2-methylpentene-1, 2,3-dimethylbutene-1, 2,3-dimethylpentene-1, 2,3,3-trimethylbutene-1, 2,3,4-trimethylpentene-1, 2,6-dimethyloctene-1, 2-methylnonadecene-1, and the like. Copolymerization of such olefins with vinylidene cyanide is disclosed in U. S. Patents 2,515,865 and 2,615,874;

(5) Alkyl esters of methacrylic acid which possess the structure

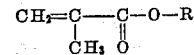

wherein R is an alkyl radical, preferably containing from 1 to 8 carbon atoms, for example, methyl methacrylate, ethyl methacrylate, propyl methacrylate, butyl methacrylate, amyl methacrylate, hexyl methacrylate, heptyl methacrylate, octyl methacrylate, decyl methacrylate, and the like. Vinylidene cyanide alkyl methacrylate copolymers and their preparation are disclosed in U. S. Patent 2,615,871;

(6) Halogenated olefins such as vinyl chloride, vinylidene chloride and 2-chloropropene. Copolymerization of these compounds with vinylidene cyanide is disclosed in U. S. Patents 2,615,869, 2,615,870 and 2,615,877;

(7) Isopropenyl esters of organic monocarboxylic acids, preferably of the formula RCOOH, wherein R is an alkyl radical containing from 1 to 6 carbon atoms, and including isopropenyl acetate, isopropenyl propionate, isopropenyl isobutyrate, isopropenyl valerate, isopropenyl caproate, and isopropenyl enanthate; as well as isopropenyl esters of aromatic carboxylic acids, for example, isopropenyl benzoate, isopropenyl p-chlorobenzoate, isopropenyl o-chlorobenzoate, isopropenyl m-chlorobenzoate, isopropenyl toluate, isopropenyl alpha-chloroacetate, isopropenyl alpha-bromopropionate, and the like; the copolymerization of all of which with vinylidene cyanide is described in U. S. Patent 2,615,875;

(8) Vinyl esters of alpha-halo saturated aliphatic monocarboxylic acids of the structure

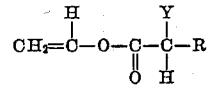

wherein R is a member of the class consisting of hydrogen and an alkyl radical, preferably a lower alkyl radical, and Y is a halogen atom, such as vinyl alpha-chloroacetate, vinyl alpha-bromoacetate, vinyl alpha-chloropropionate, vinyl alpha-bromopropionate, vinyl alpha-iodopropionate, vinyl alpha-bromovalerate and the like. The copolymerization of such monomers with vinylidene cyanide is described in U. S. Patent 2,615,876.

Still other interpolymers of vinylidene cyanide which may be plasticized in accordance with this invention are disclosed in U. S. Patents 2,615,865 to 2,615,880, 2,628,954, 2,650,911, 2,654,728, 2,654,729, 2,657,197 and copending applications Serial Nos. 268,461, 268,462 and 268,463 all filed January 26, 1952, now Patents 2,716,104, 2,716,105 and 2,716,106, respectively; 402,823, filed January 7, 1954, now Patent 2,786,046; and 407,595, filed February 1, 1954, and now abandoned, the disclosures of all of which are incorporated herein by reference.

The incorporation of the plasticizers of this invention into vinylidene cyanide polymer or interpolymer compositions can be carried out by any of several different techniques. One method of incorporation consists of adding the normally viscous liquid plasticizers to powdered vinylidene cyanide interpolymer to form a slurry and mastication of said slurry by suitable mechanical means, such as milling, calendering or blending with rotary beaters. Another method of incorporating or preparing plasticized vinylidene cyanide compositions consists in dissolving both the polymeric material and the plasticizer in a mutual solvent and spreading a film of the solution on a surface from which the solvent is evaporated.

When plasticizing the polymers by mastication, temperatures of about 50° C. less than the softening point of the particular vinylidene cyanide interpolymer are generally sufficient. However, as the plasticizer content or proportions are increased, the temperature required to blend the plasticizer uniformly with the interpolymer is lowered. In carrying out plasticization by dissolving both the plasticizer and the interpolymer in a mutual solvent, it is desired that the combined plasticizer and interpolymer concentration be less than 25 percent by weight of the total solution. Mutual solvents which will dissolve both the esters and many interpolymers are the following: dimethyl formamide and nitro alkanes, preferably the low molecular weight alkanes. The preferred method of preparing plasticized vinylidene cyanide interpolymer compositions according to this invention is mastication by a milling or calendering operation. A suitable range of amount of plasticizer to base resin is from about 5 to 200 parts, preferably 10 to 100 parts, of plasticizer per 100 parts of base resin.

The following examples are intended to illustrate methods of plasticizing vinylidene cyanide interpolymers with esters of 4-oxocarboxylic acid and alcohols, as well as to illustrate the improved characteristics of the resulting plasticized compositions when formed into sheets and films. All parts are by weight unless indicated otherwise.

*Examples 1 to 3*

Solutions consisting of 10 parts of a 1 to 1 molar copolymer of vinylidene cyanide and vinyl acetate having an intrinsic viscosity of 2.19 and 90 parts of N,N-dimethyl formamide and representative organic esters of 4-oxocarboxylic acids with alcohols were prepared by adding the particular ester to the dissolved polymer. Films having a wet film thickness of about 0.020 inch were cast from the ester:polymer:solvent solutions by spreading the solution on a glass plate and drying for 20 to 26 hours at 72 to 75° C. in a circulating hot air oven to remove the solvent. Film samples were die-cut 0.250 inch wide and 2 to 3 inches long, and elongated at a constant rate of 100 percent elongation per minute in an Instron testing machine until the samples fractured. The films were visually evaluated for compatibility of the ester with the copolymer and rated as clear, cloudy or opaque according to film appearance evidencing no precipitation, little precipitation or substantial precipitation of the ester at the film surface.

The ester employed as a plasticizer, parts of ester plasticizer employed per 100 parts copolymer and the ultimate elongation at break of the films (percent increase in length of films based on original film length) is shown in the table below:

| Example | Plasticizer | Film Clarity and Total Elongation of 1,1-dicyanoethylene copolymer at 25, 40, 60 and 80 parts plasticizer per 100 parts copolymer | | | |
|---|---|---|---|---|---|
| | | 25 | 40 | 60 | 80 |
| 1 | ethylene di-4-oxo-pentanoate. | Clear, 31% Elong. | Clear, 41% Elong. | Clear, 173% Elong. | Clear, 64% Elong. |
| 2 | diethyl 4-oxo-pimelate. | Clear, 24% Elong. | Clear, 20% Elong. | Clear, 3% Elong. | Clear, 8% Elong. |
| 3 | ethyl 4-oxopentanoate. | Clear, 25% Elong. | Clear, 39% Elong. | Clear, 19% Elong. | Clear, 19% Elong. |

*Examples 4 to 6*

Films consisting of 10 parts of a 1 to 1 molar copolymer of vinylidene cyanide and vinyl acetate having an intrinsic viscosity of 2.19 and various amounts of ethyl 4-oxopentanoate were prepared in accordance with the method described in the Examples 1 to 3. The films were die-cut 0.250 inch wide and 2 to 3 inches long, inserted between rubber lined jaws of an Instron tensile testing machine and elongated at a constant rate of 100 percent elongation per minute. The films were evaluated for compatibility of the ester with copolymer in the manner of Examples 1 to 3. Shown in the following table are the plasticizer employed, parts of ester per 100 parts of copolymer, compatibility expressed in the terms of clear, cloudy or opaque, elongation in percent and tensile strength at break in pounds per square inch.

| Example | Plasticizer | Percent | Compatibility | Elong. (percent) | Tensile (p. s. i.) |
|---|---|---|---|---|---|
| 4 | ethyl 4-oxopentanoate. | 10.0 | Clear | 35.0 | 11,500 |
| 5 | ---do--- | 25.0 | ---do--- | 41.0 | 11,200 |
| 6 | ---do--- | 40.0 | ---do--- | 39.0 | 12,800 |

*Example 7*

100 parts of a 1 to 1 molar copolymer of vinylidene cyanide and vinyl acetate having an intrinsic viscosity of 2.19 and 51 parts of ethylene di-4-oxopentanoate were masticated by mixing the polymer and ester on a 4 inch two-roll rubber mill at 270° F. The copolymer ester composition was stripped from the mill in a film form having a thickness of about 0.125 inch, molded 3 minutes at 320° F. and die-cut in strips 0.250 inch wide by 3 inches long, and the percent elongation and tensile strength at break were determined with an Instron tensile testing machine. The plasticized copolymer sheets were evaluated for compatibility of the ester with the copolymer according to the procedure described in Examples 1 to 3. Shown in the following table are the ester employed, compatibility of the ester with the copolymer, percent elongation and tensile strength expressed in terms of pounds per square inch.

| Plasticizer | Compatibility | Elong. (percent) | Tensile (p. s. i.) |
|---|---|---|---|
| ethylene di-4-oxopentanoate | Clear | 91.0 | 3,138 |

*Examples 8 and 9*

Two solutions, one consisting of 10 parts of a 1 to 1 alternating copolymer of vinylidene cyanide and vinyl acetate, and 90 parts of dimethyl formamide and another solution consisting of 10 parts of a 1 to 1 alternating copolymer of vinylidene cyanide and vinyl acetate, 90 parts of dimethyl formamide and 6 parts of ethylene 4-oxopentanoate were prepared by dissolving the copolymers and plasticizer in the selected solvent. Both solutions were cast into films having a thickness of .0024 inch and cured for 87 hours at 75° C. The films were removed from the oven, cut into test samples having dimensions of 0.250 inch by 4 inches and tested in an Instron tensile testing machine to determine ultimate tensile strength and ultimate elongation. The results of the tests are set out below:

| Example | Composition | Ultimate Tensile Strength of Film (p. s. i.) | Ultimate Elong. (percent) |
|---|---|---|---|
| 8 | 90 parts of dimethyl formamide—10 parts 1,1-dicyanoethylene vinyl acetate copolymer | 8,680 | 20 |
| 9 | 90 parts dimethyl formamide—6 parts ethylene di-4-oxopentanoate—10 parts of 1,1-dicyanoethylene vinyl acetate copolymer. | 5,100 | 40 to 75 |

Example 10

A film consisting of 10 parts of a 1 to 1 alternating copolymer of vinylidene cyanide and vinyl acetate and 5 parts ethylene di-4-oxopentanoate prepared in accordance with the method described in Examples 1 and 2, was placed in a closed container between blocks of Dry Ice. After 24 hours, the film was removed from the container and immediately folded in half. The film did not fracture or crack when completely doubled in half or upon unfolding of said film to its original linear state.

Examples 11 to 13

The dielectric constant for copolymer compositions comprising a 1 to 1 alternating copolymer of vinylidene cyanide and vinyl acetate and various amounts of a representative ester of 4-oxocarboxylic acids and alcohols was measured with a Schering bridge and guarded 3-electrode dielectric cell having an A/T constant (ratio of area to thickness) approximately equal to 250. The power loss for the compositions was also determined and is reported in terms of a tan $\delta$. The dielectric constant and power loss evaluations were carried out at a temperature of 45° C. and a frequency of 1,000 cycles per second. Shown in the following table are the ester employed as the plasticizer, parts of ester per hundred parts of copolymer, the dielectric constant and power loss of compositions containing various amounts of ester expressed in parts per hundred parts of copolymer.

| Example | Parts Ethylene Di-4-oxopentanoate per 100 Parts Copolymer | Dielectric Constant | Power Factor Loss, Tan $\delta$ |
|---|---|---|---|
| 11 | 23.6 | 3.3 | 0.045 |
| 12 | 50.8 | 11.4 | 0.15 |
| 13 | 94.4 | 50.0 | |

Example 14

One gram of vinylidene cyanide-styrene copolymer, a hard resinous power, prepared according to the teachings of U. S. Patent 2,615,868 was placed in a test tube. Five drops of ethylene di-4-oxopentanoate were added and the tube was gently heated while the mixture was stirred. The hard powder dissolved in the liquid to form a gummy mass which could be worked and formed into any desired shape—a characteristic which shows that the resinous copolymer had been plasticized.

Example 15

The procedure of Example 14 was repeated using one gram of a vinylidene cyanide-butadiene-styrene terpolymer prepared according to the teachings of copending application No. 268,462, filed January 26, 1952, now Patent 2,716,105. Again an unworkable, resinous powder was transformed by plasticization into an easily shaped material.

The above examples show that high dielectric constant, low power loss, low temperature flexibility and high distortion temperatures are unusual characteristics associated with the plasticized vinylidene cyanide/vinyl acetate copolymers of this invention.

The plasticized vinylidene cyanide polymers prepared in accordance with this invention can be further modified by incorporating therewith such ingredients as pigments, heat and light stabilizing agents, fillers and the like.

The foregoing examples and the disclosure embodied herein illustrate the novel plasticized vinylidene cyanide polymer compositions of this invention as well as their methods of preparation. Accordingly, it is not intended that this invention be limited to the specific examples, for there are numerous methods which may be employed in the practice of this invention without deviating from the scope of this invention. Therefore, it is intended that this invention shall be limited and defined only in accordance with the appended claims.

I claim:

1. A composition comprising a polymer of vinylidene cyanide and, as a plasticizer therefor, an ester of a 4-oxocarboxylic acid containing from 5 to 10 carbon atoms and an alcohol selected from the class consisting of monohydric alcohols containing 1 to 6 carbon atoms and dihydric alcohols containing from 2 to 6 carbon atoms.

2. A composition comprising an interpolymer of vinylidene cyanide and another monoolefinic monomer copolymerizable therewith and, as a plasticizer therefor, an aliphatic ester of a 4-oxocarboxylic acid containing from 5 to 10 carbon atoms with an alcohol selected from the class consisting of monohydric alcohols containing from 1 to 6 carbon atoms and dihydric alcohols containing 2 to 6 carbon atoms.

3. A composition according to claim 2 wherein the interpolymer is a copolymer of vinylidene cyanide and vinyl acetate.

4. A composition according to claim 2 wherein the plasticizer is an ester of a 4-oxo-monocarboxylic acid containing from 5 to 10 carbon atoms with a monohydric alcohol containing from 1 to 6 carbon atoms.

5. A composition according to claim 2 wherein the plasticizer is an ester of a 4-oxo-dicarboxylic acid containing from 5 to 10 carbon atoms and a monohydric alcohol containing from 1 to 6 carbon atoms.

6. A composition comprising an interpolymer of vinylidene cyanide and another monoolefinic monomer copolymerizable therewith and, as a plasticizer therefor, an aliphatic ester of 4-oxopimelic acid and an alkyl alcohol selected from the class consisting of monohydric alcohols containing 1 to 6 carbon atoms and dihydric alcohols containing 2 to 6 carbon atoms.

7. A composition according to claim 6 wherein the interpolymer is a copolymer of vinylidene cyanide and vinyl acetate and the plasticizer is diethyl 4-oxopimelate.

8. A composition comprising an interpolymer of vinylidene cyanide and another monoolefinic monomer copolymerizable therewith and, as a plasticizer therefor, an ester of 4-oxopentanoic acid and a monohydric alcohol containing 1 to 6 carbon atoms.

9. A composition according to claim 8 wherein the interpolymer is a copolymer of vinylidene cyanide and vinyl acetate and the plasticizer is ethyl 4-oxopentanoate.

10. A composition comprising an interpolymer of vinylidene cyanide and another monoolefinic monomer copolymerizable therewith and, as a plasticizer therefor, an aliphatic ester of a 4-oxocarboxylic acid of from 5 to 10 carbon atoms with a glycol of from 2 to 6 carbon atoms.

11. A composition according to claim 10 wherein the interpolymer is a copolymer of vinylidene cyanide and vinyl acetate and the plasticizer is the ethylene glycol ester of 4-oxopentanoic acid.

12. A composition according to claim 10 wherein the interpolymer is a copolymer of vinylidene cyanide and styrene and the plasticizer is the ethylene glycol ester of 4-oxopentanoic acid.

13. A composition according to claim 10 wherein the interpolymer is a terpolymer of vinylidene cyanide, styrene and butadiene and the plasticizer is the ethylene glycol ester of 4-oxopentanoic acid.

References Cited in the file of this patent

UNITED STATES PATENTS

| | | |
|---|---|---|
| 1,978,710 | Jaeger | Oct. 30, 1934 |
| 2,129,665 | Barrett et al. | Sept. 13, 1938 |
| 2,321,897 | Britton et al. | June 15, 1943 |
| 2,466,395 | Dickey | Apr. 5, 1949 |
| 2,485,281 | Gregory | Oct. 18, 1949 |
| 2,574,369 | Ardis | Nov. 6, 1951 |
| 2,654,723 | Greene | Oct. 6, 1953 |